(12) United States Patent
Cornish

(10) Patent No.: US 7,731,216 B2
(45) Date of Patent: Jun. 8, 2010

(54) ROLLOVER PREVENTION DEVICE

(76) Inventor: Keith Cornish, 22239 Stick Ross Mntn Rd., Tahlequan, OK (US) 74464

( * ) Notice: Subject to any disclaimer, the term of this patent is extended or adjusted under 35 U.S.C. 154(b) by 959 days.

(21) Appl. No.: 11/368,005

(22) Filed: Mar. 3, 2006

(65) Prior Publication Data
US 2007/0205578 A1 Sep. 6, 2007

(51) Int. Cl.
B62D 53/06 (2006.01)
(52) U.S. Cl. ......................... 280/432; 280/433
(58) Field of Classification Search .................. 280/432, 280/433, 441.1
See application file for complete search history.

(56) References Cited

U.S. PATENT DOCUMENTS 2,815,224 A * 12/1957 Waters, Jr. .................. 280/432
4,269,426 A * 5/1981 Bhushan ..................... 280/432
6,145,864 A * 11/2000 Sutherland .................. 280/432

* cited by examiner

Primary Examiner—Kevin Hurley
(74) Attorney, Agent, or Firm—McAfee & Taft

(57) ABSTRACT

A rollover prevention device for commercial tractor/trailers that senses when the tractor portion of the commercial truck has reached the critical height at which rollover of the trailer cannot be avoided. Once this critical height is reached pneumatic cylinders and pins automatically release the trailer from the tractor, thereby preserving human life and minimizing damage to property.

13 Claims, 2 Drawing Sheets

ROLLOVER PREVENTION DEVICE

FIELD OF THE INVENTION

This invention relates to the field of commercial trucks containing a tractor portion and trailer portion. Specifically, the invention involves a method for disengaging trailers from tractors at a set point that indicates that a rollover is about to occur. The disengagement of the trailer prevents a potentially catastrophic accident involving the rollover of both the trailer and the tractor.

BACKGROUND OF THE INVENTION

Commercial trucks have their own unique propensities for rolling over, quite apart from the rollovers that occur in other land vehicles. While there exists many inventions in the prior art to prevent the rolling over of one-piece land vehicles, such as those disclosed by Gilbert in U.S. Pat. No. 6,170,594 and Wielenga in U.S. Pat. No. 6,065,558, the unique problems posed by the rolling over of commercial devices have not yet been addressed. Therefore, a need exists for such a solution.

A commercial truck is traditionally composed of two parts, the tractor portion in which the driver sits, and the trailer portion, which holds the truck's load. When a tractor/trailer starts to rollover, the trailer portion will lean over to about 45 degrees and the tractor portion will then rise up to around 15 degrees from the ground. This in turn will start a "whiplash" effect that throws the tractor portion on its side with incredible force, potentially causing catastrophic damage to human life as well as property. The instant invention aims to prevent such accidents, thereby preserving valuable equipment and human life.

SUMMARY OF THE INVENTION

In the preferred embodiment of the invention, a system is defined that works in the following manner. The fifth wheel found on commercial tractors is the point where the trailer is usually connected to the tractor. In the present invention, new weight-bearing supports are situated generally in the same location as the existing fifth wheel, but are placed at opposite ends of the truck's frame, replacing these traditional stationery fifth wheels that support the weight of the trailer and its load. There are many styles of fifth wheel holders currently in commercial use, i.e., block styles, short styles, and larger non-sliding fifth wheel holders. All of these types can all be fitted with these new supports. The instant invention effectively converts the traditional fifth wheel plate into a safety feature, thereby giving insurance companies relief as well as assurance to the commercial trucking company that their equipment is safe and that in the event of a potential rollover, both the driver and the equipment will sustain a minimized amount of damage.

Each of the two weight-bearing supports is mounted on opposite sides of the fifth-wheel attachment found on the tractor. These supports are approximately 20" long, 3-4" high and 4-5" wide. They each contain pneumatic quick release cylinders that are mounted inside the long axes of the supports. Each plate has quick release pins attached to the plate itself. A push line/retract line can be run through the middle of the weight bearing supports for further protection. The power unit of the truck will provide the needed airflow to activate the pneumatic cylinders as well as the electrical power needed to detect, via sensors, the critical condition that calls for disengagement of the trailer.

Two sensors are located at the end of the weight-bearing supports to detect a problem and to protect the tractor when such a problem occurs. The inciting event occurs when the tractor/trailer starts to rollover. The trailer will lean over to about 45 degrees and the tractor will rise up to around 15 degrees from the ground. This, in turn, will cause a "whiplash" effect, throwing the tractor on its side with incredible force. The tractor is then on its pivot point and ready to flip as well. When the trailer is past 45 degrees, there is no way to correct the problem of the trailer flipping. The trailer has no choice but to lay on its side. However, the tractor can be saved from flipping through the use of the instant invention.

When the sensors detect that the tractor is 15 degrees from the ground, an actuator is activated that then pulls the pins from the pneumatic cylinders, thereby releasing the plate and setting the tractor back on the ground, discontinuing the whiplash, saving the driver and minimizing damage to the tractor.

Once the tractor is started, the compressor in the engine will start pushing air into the air tanks to build pressure. The air then flows through an actuator, such as the normally closed type manufactured by Peter Paul. Air is constantly running through the actuator. The sensors, such as the mercury, non-insulated tilt and position switches manufactured by A.E.C. Durakool, are attached to the air actuator on opposite sides of the tractor's frame. Two separate airlines go into the cylinder holders of the weight-bearing supports.

The air flows through the actuator into the cylinders and builds up the proper air pressure to run the truck. There is a sensor, such as the insulated tilt and position switches manufactured by A.E.C. Durakool, located behind the cab of the truck on the frame. This sensor is mainline directed to the battery.

When this sensor detects a 15-degree tilt or beyond, it will turn the electricity on to the mercury switches and air actuator. Once the tractor reaches 30 degrees or more, the mercury switches will change the airflow in the actuator from a forward push to a reverse push. When this happens, the spring and the quick release cylinders retract with the reversal of the airflow. When the quick release cylinders and pins release the fifth wheel, the tractor and trailer combination is broken apart. In the event the truck reaches 30 degrees, for example while driving down into a ditch, once the tractor tilt of degree is corrected, the pins will reset themselves, preventing unnecessary disconnection of the trailer.

OBJECT OF THE INVENTION

The principal object of the invention is to disconnect the trailer portion from a commercial truck in the event a potential rollover is detected, thereby reducing the potential for loss of property and human life.

DETAILED DESCRIPTION OF AN ENABLING AND PREFERRED EMBODIMENT

Figure 1:
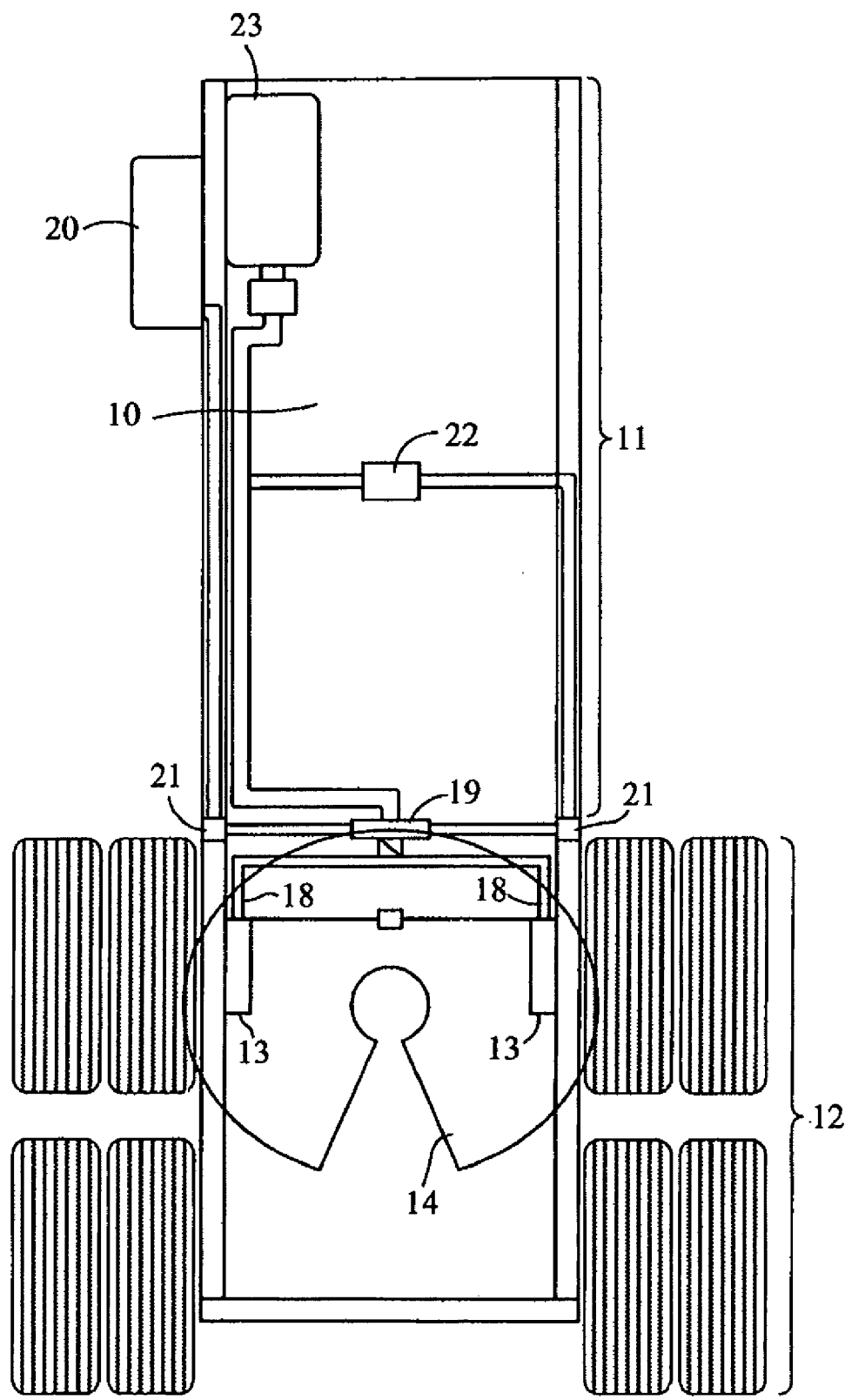
FIG. 1 illustrates a schematic view of the invention.
Figure 2:
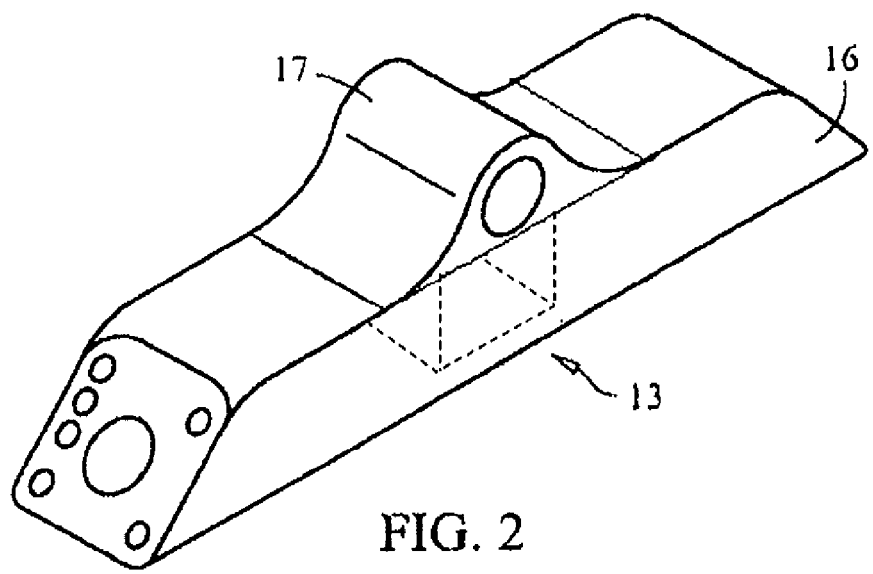
FIG. 2 illustrates a perspective view of the weight-bearing supports.
Figure 3:
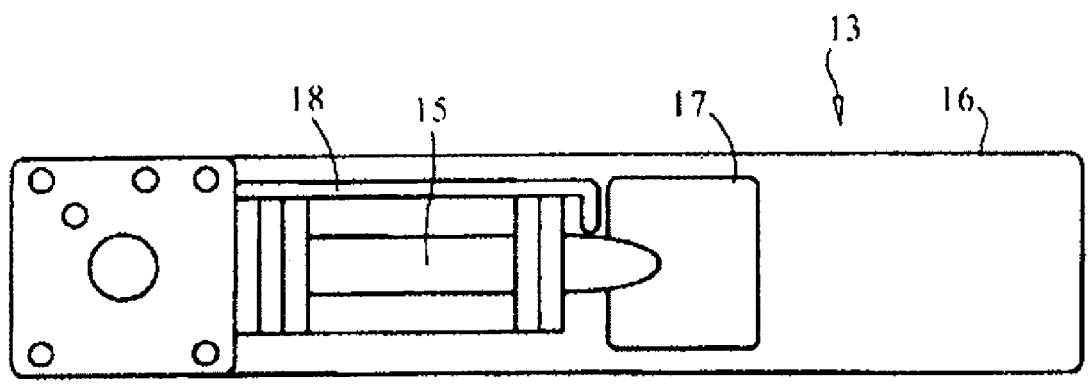
FIG. 3 illustrates a bottom view of the weight-bearing supports
Figure 4:
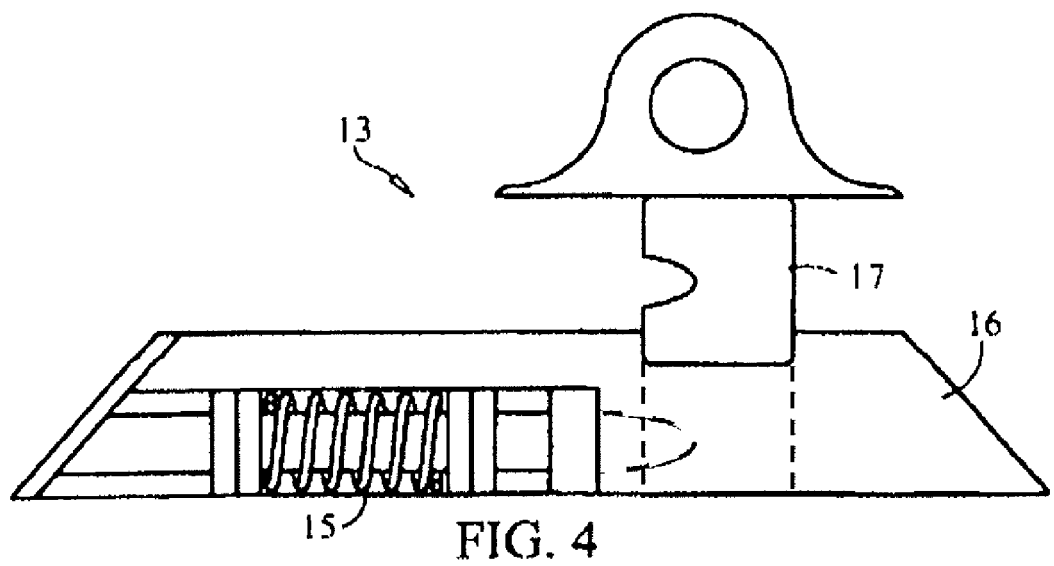
FIG. 4 illustrates a side view of the weight-bearing supports.

For a better understanding of the invention, we turn now to the drawings. FIG. 1 offers a schematic view of how the apparatus works. The top of a commercial truck 10 is generally illustrated. The tractor portion is generally designated by the number 11, while the portion that houses a trailer is designated as 12. Two weight-bearing supports 13 are shown in FIG. 1, but are described in more detail in FIGS. 2-4. The supports 13 are equidistant from the fifth wheel plate 14 located on commercial tractors. Each of the supports 13 contains pneumatic quick release cylinders 15 mounted inside the longitudinal axes 16 of the supports 13 that are activated through air that has been compressed and stored in an air tank 23. Quick release pins 17 attach the weight-bearing supports 13 to the fifth wheel plate 14. Two airflow supply lines 18 are connected to each of the pneumatic quick release cylinders 15 and to the air tank 23. An air actuator 19 is connected through an electrical means 20, usually the battery, to the airflow supply lines 18 and the weight-bearing supports 13. Two sensors 21 are connected through the electrical means 20 to the air actuator 19. The sensors 21 are positioned on opposite sides of the tractor's frame.

A tilt switch 22 is connected through the electrical means 20 to the sensors 21 and the air actuator 19, and is located behind the cab of the tractor. The tilt switch 22 senses when the tractor is 15 degrees from the ground. The tilt switch 22 activates the electrical means 20 when it senses that the tractor is 15 degrees from the ground. The sensors 21 change the air flow in the actuator 19 from a forward push to a reverse push when the tilt switch 22 measures a 30 degree angle between the tractor and the ground, thereby causing the pneumatic quick release cylinders 15 and the quick release pins 17 to release from the fifth wheel 14, thereby disconnecting the trailer from the tractor.

The illustrations and examples provided herein are for explanatory purposes and are not intended to limit the scope of the appended claims, as those skilled in the art will make modifications to the invention for particular uses.

I claim:

1. An apparatus which attaches to a commercial truck, said commercial truck being composed of a tractor portion and a trailer portion attached by a fifth wheel plate, which said apparatus automatically detaches the tractor from the trailer in the event of a trailer induced weight shift rollover, allowing the tractor to remain upright and in tact, said apparatus comprising:
   at least two weight-bearing supports equidistant from the fifth wheel plate located on said tractor, each of said weight-bearing supports containing a pneumatic quick release cylinder mounted inside a longitudinal axis of said weight-bearing supports, wherein said pneumatic quick release cylinder being activated through air that has been compressed and stored in an air tank, thereby creating an air flow supply;
   at least one quick release pin that attach said weight-bearing supports to said fifth wheel plate;
   at least two air flow supply lines connected to each of said pneumatic quick release cylinders;
   an air actuator connected through an electrical means to said airflow supply lines and said weight-bearing supports;
   at least two sensors connected through said electrical means to said air actuator, said sensors positioned on opposite sides of said tractor's frame;
   a tilt switch connected through said electrical means to said sensors and said air actuator located behind the cab of said tractor, said tilt switch sensing when said tractor is 15 degrees from the ground, said tilt switch activating said electrical means when 15 degrees from the ground has been sensed, said sensors then changing an air flow in said actuator from a forward push to a reverse push when said tilt switch measures a 30 degree angle between said tractor and the ground, thereby causing said pneumatic quick release cylinders and said quick release pins to release from said fifth wheel, thereby breaking apart said trailer from said tractor.

2. The apparatus of claim 1 wherein said airflow supply is derived from air that is compressed and stored in an air tank located in the engine area of said commercial truck that begins pushing air into air tanks once an engine is started and begins to build an air pressure in said air tanks.

3. The apparatus of claim 1 wherein said air actuator is a three-way normally closed air actuator.

4. The apparatus of claim 1 wherein said tilt switches are non-insulated.

5. The apparatus of claim 1 wherein said weight-bearing supports are about 20 inches long.

6. The apparatus of claim 1 wherein said weight-bearing supports are between about 3 and about 4 inches high.

7. The apparatus of claim 1 wherein said weight-bearing supports are between about 4 and about 5 inches wide.

8. A vehicle rollover prevention apparatus comprising:
   a vehicle carrying a fifth-wheel, wherein said fifth wheel detachably connects a tractor and a trailer;
   a plurality of weight-bearing supports attached to said fifth-wheel, each weight-bearing support being oppositely and outwardly positioned on said fifth-wheel;
   a quick-release pin capable of having a portion inserted into said weight-bearing support, wherein each weight-bearing support is associated with at least one quick-release pin;
   a quick-release cylinder associated with each quick-release pin, said quick release cylinder capable of being inserted within at least a portion of said quick-release pin, wherein said quick-release cylinder is responsive to an air flow in an airflow supply line;
   a spring disposed around said quick-release cylinder;
   an air tank storing air that has been compressed, said air tank providing a compressed air source in fluid communication with said quick-release cylinder and said airflow supply line, said compressed air source capable of providing pressurized air thereto thereby creating an air flow in said airflow supply line;
   a directional air flow actuator positioned in-line with said air supply line; and
   a tilt switch in communication with said directional air flow actuator, said tilt switch having a sensor capable of detecting when said vehicle is at an angle relative to the ground and capable of sending a signal to reverse the flow of air through said directional air flow actuator when said vehicle is at an angle relative to the ground.

9. The apparatus of claim 8, wherein said tilt switch is capable of detecting the angle of tilt of said trailer relative to the ground.

10. The apparatus of claim 8, wherein the tilt switch is activated when said angle is 15 degrees.

11. The apparatus of claim 8, wherein the tilt switch is activated when said angle is 30 degrees.

12. The apparatus of claim 8, wherein said weight-bearing supports are about 20 inches long, between about 3 and about 4 inches high, and between about 4 and about 5 inches wide.

13. The apparatus of claim 8, wherein said directional air flow actuator is a three-way normally closed directional air flow actuator.

\* \* \* \* \*